US006946973B1

(12) United States Patent
Yanda

(10) Patent No.: US 6,946,973 B1

(45) Date of Patent: Sep. 20, 2005

(54) PRECISION PARKING DEVICE

(76) Inventor: Leon M. Yanda, 11004 Hwy. 156 W., West Fork, AR (US) 72774

( * ) Notice: Subject to any disclaimer, the term of this patent is extended or adjusted under 35 U.S.C. 154(b) by 102 days.

(21) Appl. No.: 10/454,058

(22) Filed: Jun. 3, 2003

Related U.S. Application Data

(63) Continuation-in-part of application No. 10/077,112, filed on Feb. 19, 2002, now Pat. No. 6,652,323.

(51) Int. Cl.[7] ............................ B60Q 1/48; G08G 1/14

(52) U.S. Cl. ................ 340/932.2; 340/942; 340/932.2; 340/686.1

(58) Field of Search .......................... 340/932.2, 686.1, 340/942

(56) References Cited

U.S. PATENT DOCUMENTS

| | | | | |
|---|---|---|---|---|
| 4,665,378 | A | 5/1987 | Heckathorn | 340/51 |
| 5,285,205 | A | 2/1994 | White | 340/932.2 |
| 5,623,259 | A | 4/1997 | Giangardella | 340/932.2 |
| 5,841,368 | A | 11/1998 | Bryant | 340/932.2 |
| 6,002,346 | A | 12/1999 | Bowden et al. | 340/932.2 |
| 6,154,150 | A | 11/2000 | Laubach | 340/932.2 |
| 6,184,800 | B1 | 2/2001 | Lewis | 340/932.2 |
| 6,191,706 | B1 * | 2/2001 | Kositkun | 340/932.2 |
| 6,218,962 | B1 * | 4/2001 | Fiene | 340/932.2 |
| 6,531,966 | B2 | 3/2003 | Krieger | 340/932.2 |

* cited by examiner

*Primary Examiner*—Jeffery Hofsass
*Assistant Examiner*—Lam Pham
(74) *Attorney, Agent, or Firm*—Keisling Pieper & Scott PLC; David B. Pieper; Trent C. Keisling

(57) ABSTRACT

A precision light source, such as a laser, controlled by the operation of a garage door opener to generate a light beam to provide a reference mark for guiding a user in parking a vehicle. One embodiment teaches powering the unit from the light activation circuitry of the garage door opener directly, or using a bulb connection base having an auxiliary light socket. Further improvements include the use of an aiming device providing dimensional adjustment of the light beam to move the distal reference point created when the light beam intersects the vehicle. A method for use of the apparatus is also taught.

17 Claims, 3 Drawing Sheets

PRECISION PARKING DEVICE

CROSS-REFERENCE TO RELATED APPLICATIONS

This application claims priority to and is a continuation-in-part of U.S. application Ser. No. 10/077,112 filed Feb. 19, 2002 now U.S. Pat. No. 6,652,323.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention.

The present invention relates to the field of parking assist devices in general. The invention teaches the utilization of a light source that is mounted to generate and direct light in a concentrated beam for positioning a vehicle/equipment in the light beam such that it shines on a particular part of the vehicle so that the vehicle/equipment is repeatedly parked in a precise location. In particular, the present invention is specifically directed to utilization of a precision light source, such as a laser, powered directly off of the garage door opener. Known art may be found in U.S. Class 340/932.2, 933, and 988 as well as other classes and subclasses.

2. Description of the Known Art.

As will be appreciated by those skilled in the art, a light may be used to guide or assist a user in parking an auto vehicle or other type of vehicle in a parking space. Details of a typical guide are contained in U.S. Pat. No. 6,531,966 issued to Krieger on Mar. 11, 2003; U.S. Pat. No. 6,184,800 issued to Lewis on Feb. 6, 2001; U.S. Pat. No. 6,154,150 issued to Laubach on Nov. 28, 2000; U.S. Pat. No. 6,002,346 issued to Vowden et al. on Dec. 14, 1999; U.S. Pat. No. 5,841,368 issued to Bryant on Nov. 24, 1998; U.S. Pat. No. 5,623,259 issued to Giangardella on Apr. 22, 1997; U.S. Pat. No. 5,285,205 issued to White on Feb. 8, 1994; and U.S. Pat. No. 4,665,378 issued to Heckethorn on May 12, 1987. Each of these patents are hereby expressly incorporated by reference in their entirety.

U.S. Pat. No. 6,002,346 issued to Vowden et al. on Dec. 14, 1999 is entitled Vehicle Positioning Apparatus. As shown in FIG. 1 of the drawings a vehicle positioning apparatus 10 uses a sensor 34 for detecting the operation of a light source 32 to project a light beam 192 toward a vehicle when the sensor senses the operation of a garage door opener 16. As noted in column 1, lines 36–40 this invention is not directly connected to the garage door opener. As further noted in column 4, lines 40–46 the unit is powered through an electrical outlet connected to the apparatus 10.

U.S. Pat. No. 4,665,378 issued to Heckethom on May 12, 1987 is entitled Motor Vehicle Garaging Safety Methods, and Apparatus and Systems. As noted in the brief summary, this patent describes the use of a signal light projected in a concentrated beam downwardly when a garage door is fully opened to provide a light spot on the garage floor when no vehicle provides an obstruction and on the vehicle, such as on the dashboard thereof, when a vehicle is at a properly parked position in the garage. The light source is controlled by the position of the garage door so that it is only illuminated when the door is fully opened. As noted in column 6, line 28 the signal or indicator of this patent is energized from a lamp circuit with a series connected limit switch so as to be illuminated after the door stops moving and reaches the fully opened position. This is done with a series connected door up switch which has a normally open contact which is closed when the door is positioned in the up position. The light source is left on for however long the garage door remains open.

Other parking devices use proximity sound devices that are measurably less accurate and are one-dimensional (fore and aft) only. Such devices are triggered by adults, children, or even a pet in the garage. Another device includes an object, such as a tennis ball, that is hung down so that the driver can maneuver the vehicle/equipment to bring the hanging object to a predetermined location on the vehicle/equipment. Such hanging devices are continuously hanging in the way when the vehicle is not parked in the space, thereby limiting other uses of the parking location. There is a need for a device that assists a driver to maneuver a vehicle to be more precisely located, i.e., two dimensionally (fore and aft as well as side to side) for greater accuracy in parking and to allow clear alternate use of the space.

Thus, it may be seen that these prior art patents are very limited in their teaching and utilization and provide an overly complex system for providing a simple guided precision light source and for providing electrical power and operational signals. What is needed then is a precision light source for providing a guiding beam for parking a vehicle within a space that operates off the garage door opener light system to only be on when the garage door opener light is on.

SUMMARY OF THE INVENTION

The present invention is directed to improved parking assist devices. In accordance with one exemplary embodiment of the present invention, a parking assist apparatus is provided that is adapted to help a user maneuver a vehicle into a space accessed by door controlled by a door opener. The door opener uses a control circuit for activating a diffusing light powered by an electrical lamp output. The parking assist apparatus includes a precision light source directly activated by a unique connection into the electrical lamp output of the door opener. The precision light source is used to project a distinct light pattern to a distal reference point for guiding the user. This provides a unique connection scheme to allow an unskilled user to make one simple connection, such as screwing in a light bulb, and a simple adjustment of the aiming of the light beam to connect and have the apparatus fully operational, or supplied by the door opener manufacturer and connected to the door opener light circuit.

Advantages of the present invention include simple integration using familiar connections for operation with existing systems; elimination of unnecessary switches and connections which make the system complicated; low cost construction and installation; and provisions for providing the original broadcast light source.

The invention includes a bright precision light, laser light, or other bright light that is attached to a facility structure such that it can be aimed to a predetermined location as desired. The light can be switched on and off by direct means, but preferably be made to switch on and off by the garage door opener electrical circuit. The switching mechanism can be by manual switch, photocell control from the garage door opener light, or can be made to switch on and off along with the garage door opener light bulb. Power for the light can be by alternate direct electrical circuits, battery power, or can be powered by a low voltage circuit tied into the garage door opener light circuit. Preferable operation of the light is to have wiring circuits such that the precision parking light is powered by and comes on and off with the garage door opener timed light.

The invention also includes a screw-in adapter for the garage door opener light bulb socket, and provides an alternate light bulb socket along with a pigtail wire and electrical plug. A low voltage ac-dc adapter is provide to plug into the electrical plug, and provides low voltage power for the precision light source(s). One or more precision light sources can be controlled by the same circuit to provide parking lights in a doublewide (or more) garage if desired. After making the electrical connections of the invention, the vehicle/equipment can be precisely parked as desired. The light is then mounted to the ceiling of the parking garage in such location to shine down on a predetermined location (probably a prominent location such as for a vehicle, the edge of the dash and in line with the steering wheel, or other such convenient location). The vehicle/equipment can thereafter be maneuvered such that the light comes to shine in the desired predetermined location to cause the vehicle/equipment to always be parked in the same location, both fore and aft and side to side.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
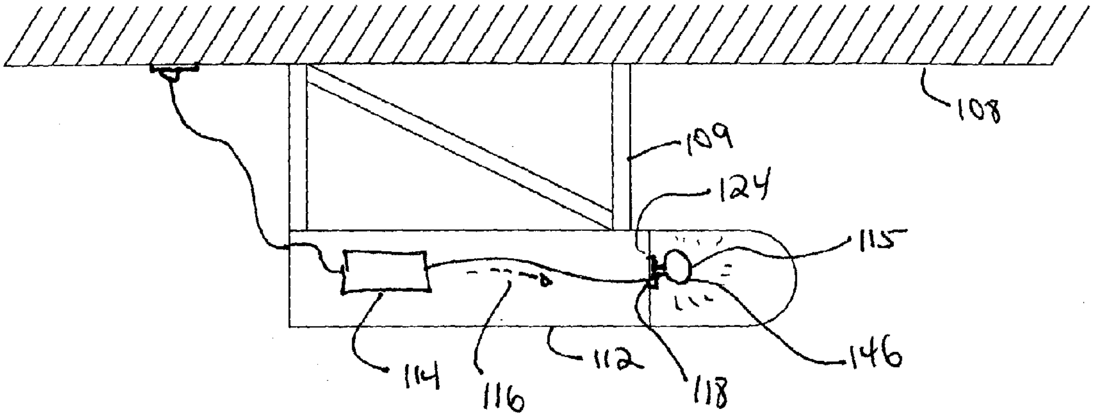
FIG. 1 is a schematic view of a garage door opener mounted to a solid surface using a standard diffusion light bulb.

As shown in FIGS. 1–4 of the drawings, the parking assist apparatus 100 is adapted for connection into a door opener 112. FIG. 1 shows a typical garage door opener 112 with a broadcast light 115. The garage door opener 112 is mounted by steel strapping 109 to a solid surface 108 shown as the garage ceiling 108. The garage door opener 112 utilizes a control circuit 114 for controlling the broadcast lights 115. The broadcast lights 115 are powered by a power flow 116 from the control circuit 114 into a main light socket 124. In this manner, the power flow 116 provides an electrical signal output 118 at a main light socket 124 for powering the broadcast light 115.

The parking assist apparatus 100 (shown in FIG. 2) utilizes a precision light source 126, shown in the preferred embodiment as a laser 126 or a laser pointer 126, which broadcasts a defined beam 130 (shown in FIG. 3) in a distinct light pattern 134 at an intersection area 138 on the vehicle 102. The precision light source 126 is powered by connection through transformed voltage wires 141 to an electrical conversion circuit 140, also known as an electrical converter 140, which is connected into a socket base 142 or a socket adaptor 142 for connection into the main light socket 124. In this manner, the precision light source 126 receives its power and on/off control signals directly from the garage door opener in a simple, easy to connect system. The socket base 142 may also have an accessory light socket 144 which may be used for powering a secondary light bulb 146 having a reduced size base 148 for connection with the accessory light socket 144. This allows the connection to power both a diffused light and a precision light. In the preferred embodiment, the socket base 142 is a mini-base/standard bulb adapter 142 that is screwed into the existing garage door opener light socket 124. In this manner, a mini-base light bulb 148 with a mini base 147 may be screwed into the adapter 142 and the pigtail wires 145 can connect to the electrical plug socket 149. A standard ac-dc power adapter 140 will then plug into the electrical plug socket 149 and low voltage wires 141 are used to connect to the precision light 126. The precision light 126 is attached to an aiming device 150 mounting bracket that is in turn attached to the garage ceiling 108.

Figure 2:
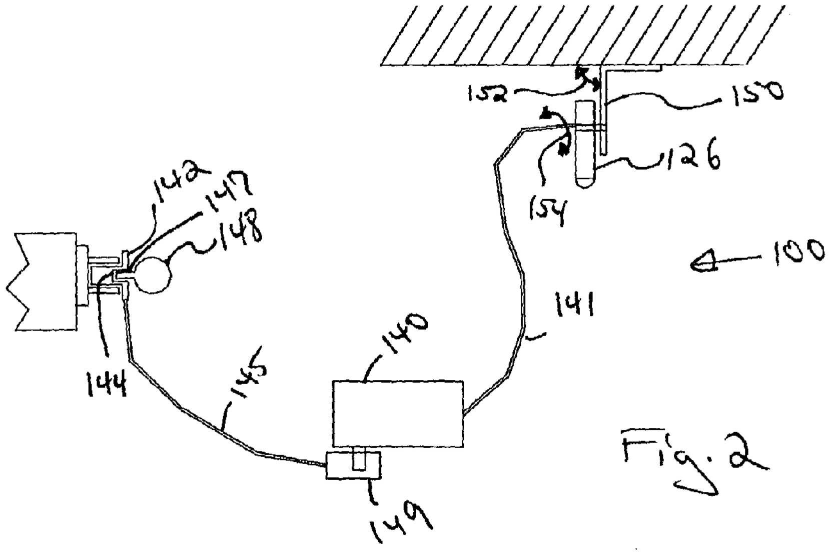
FIG. 2 is a schematic view of a precision parking device connected to the garage door opener of FIG. 1 for powering the precision light and providing an alternate diffusion light.
Figure 3:
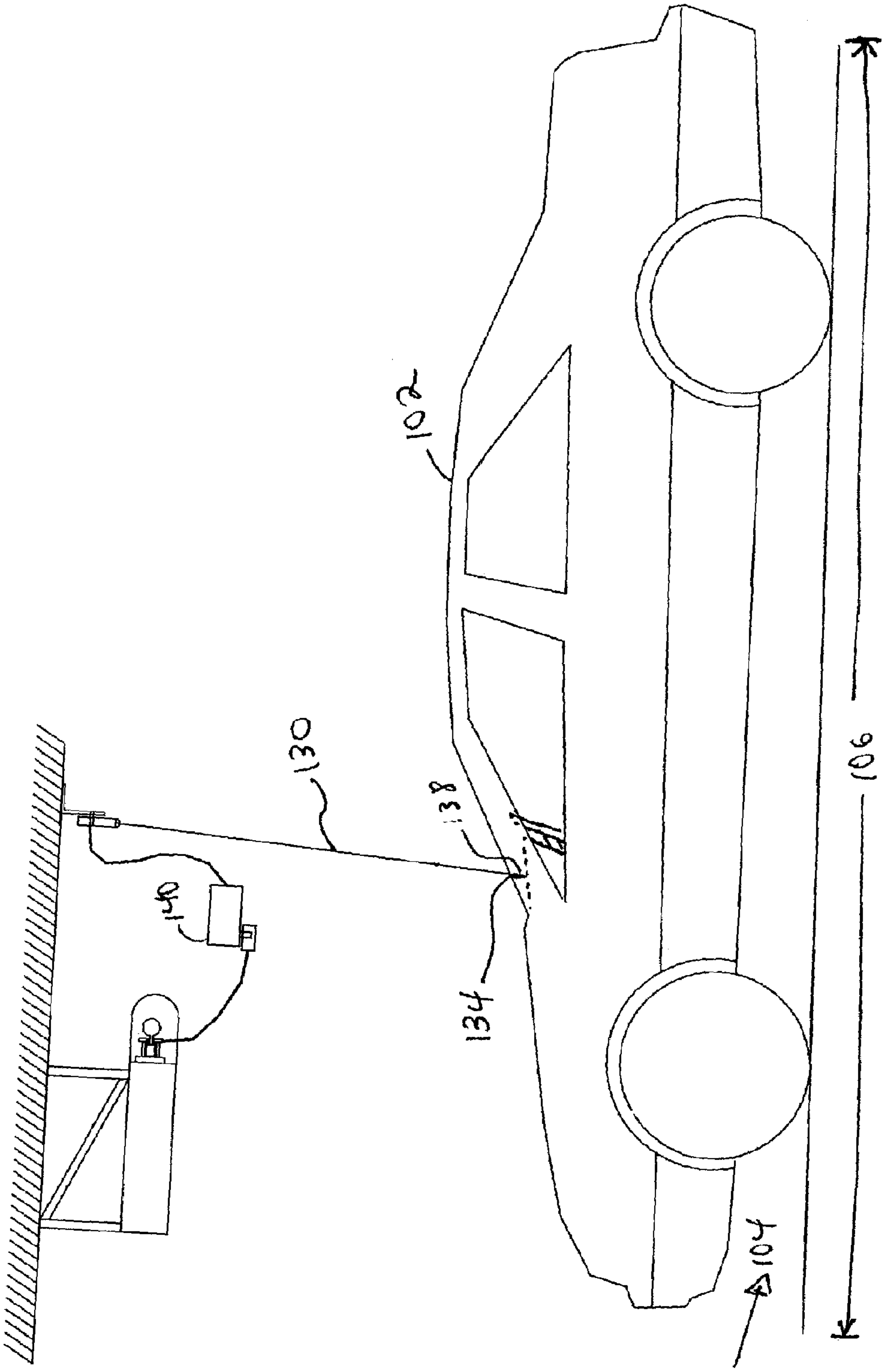
FIG. 3 is a schematic view of an automobile parked under the precision light showing the intersection of the beam and the automobile.

As shown in FIGS. 2 and 3 an aiming device 150 is a simple pivoting bolt connection and metal plate which may be bent and pivoted to provide a first dimensional adjustment 152 and a second dimensional adjustment 154 for aiming the precision light source 126.

Figure 4:
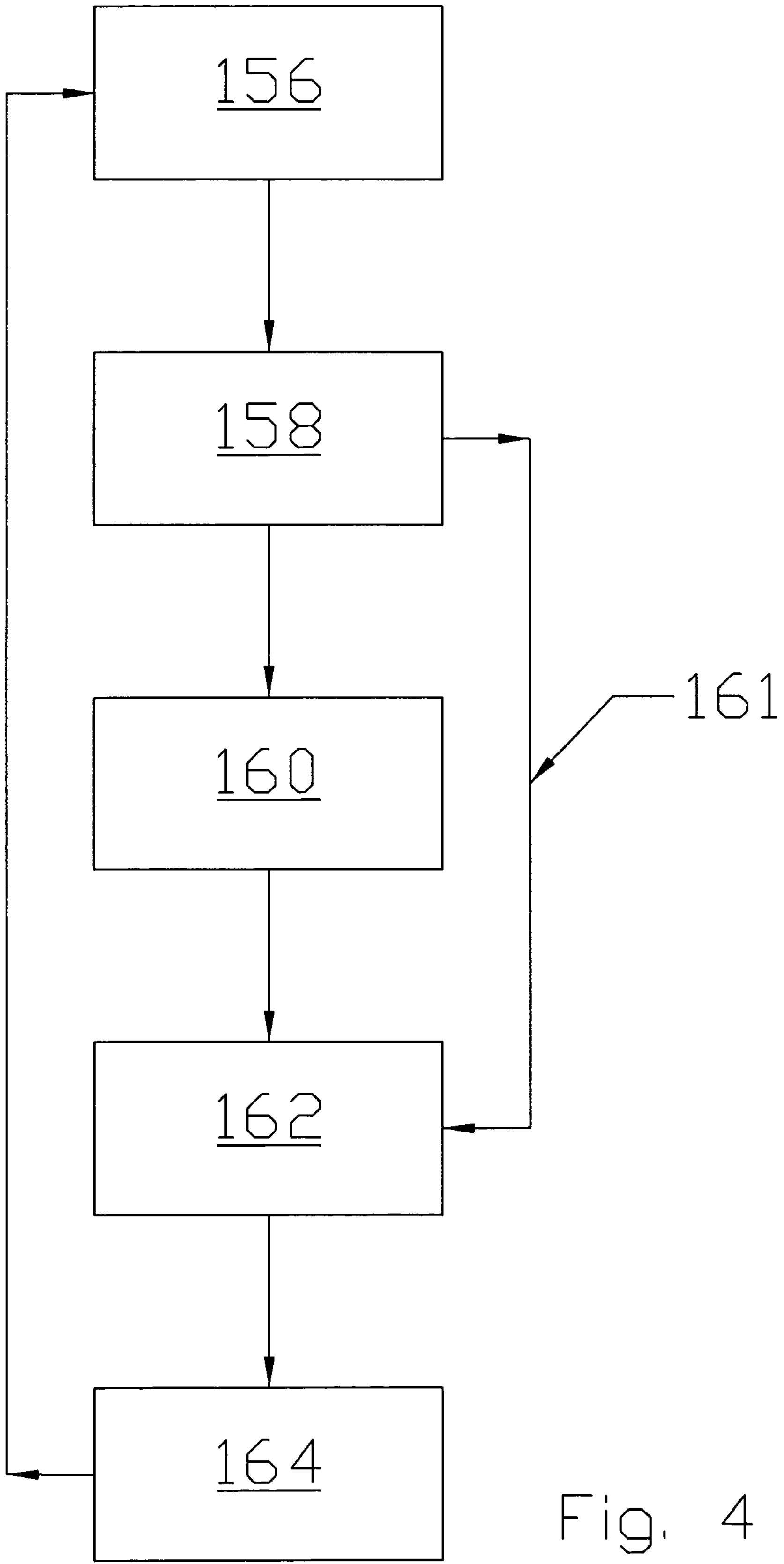
FIG. 4 is a flow chart of the operation of the precision parking device.

FIG. 4 of the drawings provides a flow chart utilized for the method of operation for the present invention. As shown in FIG. 4 of the drawings the method initiates by sensing 156 the on state of the electrical signal output and continues by activating 158 the precision light source 126 and the mini-base light bulb 148, thereby providing the normal garage door opener light. Electrical power is provided through the pigtail wires 145 to the electrical plug 149 and ac-dc power adapter 140. The low voltage wires 141 provide dc power to the precision light 126, thereby providing the precision light shining down on the vehicle/equipment 102 below. On the first or initial operation, the precision light source 126 may then be adjusted or aimed by positioning the precision light source 160 to shine the beam on the desired part of the parked vehicle 102. This step may be skipped 161 in repetitive operation of the device. Any vehicle/equipment 102 is then maneuvered to cause the precision light 126 to shine down upon a predetermined location on the vehicle/equipment 102, thereby precisely locating the vehicle/equipment 102 within the facility. The method continues by sensing the off state of the electrical signal output 162 and then deactivating 164 the precision light source. The unit will then wait until the sensing 156 of the on state of the electrical signal output to continue the process in a repetitive manner.

Reference numbers used to refer to various parts of the preferred embodiment are consistently used as follows:

a parking assist apparatus 100
a vehicle 102
a particular location 104
a space 106
a solid surface 108
metal strapping 109 a door opener 112
a control circuit 114
broadcast light 115
power flow 116
an electrical signal output 118
a main light socket 124
a precision light source, a laser, a laser pointer 126
a defined beam 130
a distinct light pattern, an end pattern, a dot, a distal reference point 134
an intersection area 138
an electrical conversion circuit, an electrical converter 140
transformed voltage wires 141
a socket base, a socket adapter 142
an accessory light socket 144
pigtail wires 145
a diffusion light bulb 146
a reduced sized base 147
a mini bulb 148
electrical plug socket 149
an aiming device 150
a first dimensional adjustment 152
a second dimensional adjustment 154
sensing 156
activating 158
positioning 160
skipped 161
sensing the off state of the electrical signal output 162
deactivating the precision light source 164

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense, and the invention could be wired into and controlled directly by the garage door opener light circuit.

What is claimed is:

1. A parking assist apparatus adapted to help a user maneuver a vehicle in a space accessed by door controlled by a door opener, the door opener utilizing a control circuit for activating an electrical lamp output at a light bulb socket, the assist apparatus comprising:

a socket adapter adapted to screw into the light bulb socket and electrically connect to the electrical lamp output; and a precision light source electrically connected to the socket adapter and activated by the electrical lamp output of the door opener, the precision light further adapted project a distinct light pattern to a distal reference point for guiding the user.

2. The parking assist apparatus of claim 1, the precision light source comprising:

a laser.

3. The parking assist apparatus of claim 1, the distinct light pattern comprising:

a dot.

4. The parking assist apparatus of claim 1, further comprising:

an aiming device connected to the precision light source, the aiming device adapted to be mounted to a solid surface and allow at least one dimensional adjustment of the distal reference point in relation to the aiming device.

5. The parking assist apparatus of claim 4, the aiming device adapted to allow a second dimensional adjustment of the distal reference point in relation to the aiming device.

6. The parking assist apparatus of claim 1, further comprising:

an electrical conversion circuit connected between the electric lamp output and the precision light, wherein the electrical conversion circuit is adapted to transform power supplied by the electric lamp output for use by the precision light source.

7. The parking assist apparatus of claim 1, the socket adapter further comprising:

an accessory light socket.

8. The parking assist apparatus of claim 7, the accessory light socket adapted to accept a light bulb having a reduced sized base.

9. A parking assist apparatus comprising:

a garage door opener having a control circuit for activating an electrical signal output at a light bulb socket;

a socket adapter adapted to screw into the light bulb socket and electrically connect to the electrical signal output; and a precision light source adapted to respond to the electrical signal output and selectively project a distinct light pattern to a distal reference point for guiding the user.

10. The parking assist apparatus of claim 9, the precision light source comprising:

a laser.

11. The parking assist apparatus of claim 9, the distinct light pattern comprising:

a dot.

12. The parking assist apparatus of claim 9, further comprising:

an aiming device connected to the precision light source, the aiming device adapted to be mounted to a solid surface and allow at least one dimensional adjustment of the distal reference point in relation to the aiming device.

13. The parking assist apparatus of claim 12, the aiming device adapted to allow a second dimensional adjustment of the distal reference point in relation to the aiming device.

14. A parking assist apparatus adapted to help a user maneuver a vehicle in a garage having a garage door controlled by a garage door opener, the garage door opener having a control circuit for activating a power flow to a light bulb socket, the parking assist apparatus comprising:

a socket adapter adapted to electrically connect into the light bulb socket;

an electrical converter electrically connected to the socket adapter; and a laser pointer electrically connected to the electrical converter such that the laser pointer is activated by the control circuit, the laser pointer aimed to project a defined beam forming an end pattern such that the driver of the vehicle can maneuver vehicle in the path of the beam to place the vehicle so that the end pattern is visible at a particular location on the vehicle to ensure that vehicle is properly positioned in the garage.

15. The apparatus of claim 14, wherein the end pattern is a dot.

16. The apparatus of claim 14, further comprising:

an accessory light socket electrically connected to the socket adapter.

17. A method for positioning a vehicle at a location having a garage door opener with a control circuit with an electrical signal output at a light bulb socket, the electrical signal output having an on state and an off state, the method comprising:

connecting a precision light source into the electrical signal output using a socket adapter inserted into the light bulb socket;

activating the precision light source using the electrical signal output for projecting a beam adapted to form an end pattern on the vehicle at an intersection area on the vehicle when the vehicle is properly positioned at the location;

positioning the vehicle at the location such that the beam intersects the vehicle at the intersection area.

* * * * *